US011137268B2

(12) United States Patent
Kim et al.

(10) Patent No.: US 11,137,268 B2
(45) Date of Patent: Oct. 5, 2021

(54) APPARATUS FOR GENERATING EXCITATION SIGNAL OF RESOLVER AND VEHICLE INCLUDING THE SAME

(71) Applicants: Hyundai Motor Company, Seoul (KR); Kia Motors Corporation, Seoul (KR)

(72) Inventors: Seonghan Kim, Gyeonggi-do (KR); Hun Kong, Gyeonggi-do (KR); Gun Soo Kang, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 974 days.

(21) Appl. No.: 15/795,371

(22) Filed: Oct. 27, 2017

(65) Prior Publication Data

US 2018/0128651 A1 May 10, 2018

(30) Foreign Application Priority Data

Nov. 4, 2016 (KR) .................... 10-2016-0146527

(51) Int. Cl.
*G01D 5/20* (2006.01)
*H02P 6/16* (2016.01)
(Continued)

(52) U.S. Cl.
CPC .......... *G01D 5/2066* (2013.01); *B60L 3/0084* (2013.01); *G01D 5/204* (2013.01);
(Continued)

(58) Field of Classification Search
CPC ......... B60L 3/0084; B60L 50/61; G01D 5/20; G01D 5/204; G01D 5/2066; G01D 5/2073;
(Continued)

(56) References Cited

U.S. PATENT DOCUMENTS 5,304,909 A * 4/1994 Jin ..................... G05B 19/31
318/661
5,861,768 A * 1/1999 Fujita ............... H02M 3/33507
318/661

(Continued)

FOREIGN PATENT DOCUMENTS

DE       102015202303 A1 * 8/2016 ............... H03F 1/52
JP           60244105 A * 12/1985 ............... H03F 1/52

*Primary Examiner* — Jared Fureman
*Assistant Examiner* — Nicolas Bellido
(74) *Attorney, Agent, or Firm* — Mintz Levin Cohn Ferris Glovsky and Popeo, P.C.; Peter F. Corless

(57) ABSTRACT

An apparatus for generating a resolver excitation signal and a vehicle including the same are provided. The apparatus includes an input portion that is configured to receive an input signal and a current amplifier that is configured to generate an output signal by amplifying the input signal and that has a circuit protector that protects a circuit from an overcurrent. An output portion is configured to output the output signal. Additionally, the circuit protector includes a first transistor that has an emitter connected to the output portion, a second transistor that has a collector connected to the output portion and a base connected to a base of the first transistor and a rectifier connected to a base of the first transistor and the base of the second transistor.

10 Claims, 8 Drawing Sheets

(51) Int. Cl.
    *H02P 9/10*           (2006.01)
    *B60L 3/00*           (2019.01)
    *H02P 29/024*        (2016.01)
    *H02H 3/08*           (2006.01)
    *H02P 101/45*        (2016.01)
    *B60L 50/61*          (2019.01)

(52) U.S. Cl.
    CPC ............... *H02H 3/08* (2013.01); *H02P 6/16* (2013.01); *H02P 9/10* (2013.01); *H02P 29/0241* (2016.02); *B60L 50/61* (2019.02); *H02P 2101/45* (2015.01); *H02P 2203/00* (2013.01)

(58) Field of Classification Search
    CPC .......... G05F 1/461; H02H 3/08; H02H 7/122; H02K 11/21; H02K 29/06; H02M 3/156; H02P 2101/45; H02P 2203/00; H02P 29/0241; H02P 6/10; H02P 6/16; H02P 9/10; H03F 1/52; H03F 3/3074; H03K 17/6871; H03K 4/696; H03K 6/02
    USPC ........................................................ 318/661
    See application file for complete search history.

(56) References Cited

U.S. PATENT DOCUMENTS

| | | | |
|---|---|---|---|
| 9,778,071 B2* | 10/2017 | Klesyk | G01D 5/2073 |
| 9,880,027 B2* | 1/2018 | Nakamura | G01D 5/20 |
| 2014/0361792 A1* | 12/2014 | Nakamura | G01D 5/20 |
| | | | 324/655 |
| 2015/0362338 A1* | 12/2015 | Klesyk | G01D 5/20 |
| | | | 324/207.15 |

* cited by examiner

APPARATUS FOR GENERATING EXCITATION SIGNAL OF RESOLVER AND VEHICLE INCLUDING THE SAME

CROSS-REFERENCE TO RELATED APPLICATION

This application claims the benefit of Korean Patent Application No. 10-2016-0146527, filed on Nov. 4, 2016 in the Korean Intellectual Property Office, the disclosure of which is incorporated herein by reference.

BACKGROUND

1. Field of the Disclosure

The present disclosure relates to a vehicle, and more particularly, to an apparatus for generating a resolver excitation signal and a vehicle including the same.

2. Description of the Related Art

Generally, vehicles may include a three-wheeled or four-wheeled vehicle, a two-wheeled vehicle such as a motorcycle, a motorized bicycle, construction equipment, a bicycle, a train traveling on rails and the like. A conventional vehicle may acquire power required to rotate vehicle wheels using various methods. For example, a conventional vehicle acquires thermal energy by burning fossil fuels (e.g., gasoline or diesel), converts the thermal energy into mechanical energy necessary to rotate vehicle wheels and thereby generates the power to rotate vehicle wheels.

Recently, electrical energy has been used to generate power required to rotate vehicle wheels using electric energy charged in a battery mounted in the vehicle. As described above, the vehicle configured to acquire power using electric energy is referred to as an electric vehicle (EV). Various types of electric vehicles may be used, for example, a general electric vehicle (EV) that is configured to acquire power using electric energy, a hybrid electric vehicle (HEV) that is configured to acquire power at least one of thermal energy produced by combustion of fossil fuels and electric energy, and a Plug-in Hybrid Electric Vehicle (PHEV) configured to use both thermal energy generated from combustion of fossil fuels and electric energy and charge a battery embedded therein upon receiving electric energy from an external supply.

The above information disclosed in this section is merely for enhancement of understanding of the background of the disclosure and therefore it may contain information that does not form the prior art that is already known in this country to a person of ordinary skill in the art.

SUMMARY

The present disclosure provides an apparatus for generating a resolver excitation signal capable of improving safety of a circuit configured to generate an excitation signal applied to a resolver, and a vehicle including the same. According to an aspect of the present disclosure, the apparatus for generating an excitation signal may include an input portion configured to receive an input signal, a current amplifier configured to generate an output signal by amplifying the input signal and include a circuit protector for protecting a circuit from an overcurrent and an output portion configured to output the output signal. The circuit protector may include a first transistor include an emitter connected to the output portion, a second transistor include a collector connected to the output portion and a base connected to a base of the first transistor and a rectifier connected to a base of the first transistor and the base of the second transistor. A base of the first transistor, the base of the second transistor, and the rectifier may be connected to one node.

In some exemplary embodiments, the apparatus may include a voltage amplifier having an inversion input terminal coupled to the input portion and an output terminal connected to the rectifier that may be configured to amplify the input signal, and transmit the amplified input signal to the rectifier. The inversion input terminal may be configured to receive a feedback signal corresponding to the output signal. When the output portion is short-circuited, the rectifier may terminate operation and the output signal may be input to the inversion input terminal of the voltage amplifier along a path that applies the feedback signal to the inversion input terminal.

The current amplifier may further include a third transistor having a collector connected to an external power source and an emitter connected to a collector of the first transistor. When short-circuiting does not occur and the voltage amplifier outputs a positive signal, the base of the first transistor may be configured to receive all or a portion of the input signal and the emitter of the first transistor may be configured to amplify a current of the input signal and output the amplified current.

In addition, the base of the second transistor may be configured to receive a portion of the input signal and the collector of the second transistor may be configured to amplify a portion of the input signal and outputs the amplified signal. The current amplifier may further include a fourth transistor having a collector connected to an emitter of the second transistor. In particular, when the voltage amplifier outputs a positive signal, the fourth transistor may be configured to terminate operation and when the voltage amplifier outputs a negative signal, the fourth transistor may be configured to initiate operation. When the output portion is short-circuited to a ground terminal, the input signal may be applied to the output portion through the rectifier and the first transistor, or may be applied to the output portion through the rectifier and the second transistor.

In another aspect of the present disclosure, a vehicle may include a resolver electrically connected to a motor and configured to detect the degree of rotation of the motor and an excitation signal generator configured to provide the resolver with an excitation signal. The excitation signal generator may include an input portion configured to receive an input signal, an output portion configured to output an excitation signal, a first transistor having an emitter connected to the output portion, a second transistor having a base connected to a base of the first transistor and a collector connected to the output portion and a rectifier electrically connected to the input portion and connected to a base of the first transistor and a base of the second transistor.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
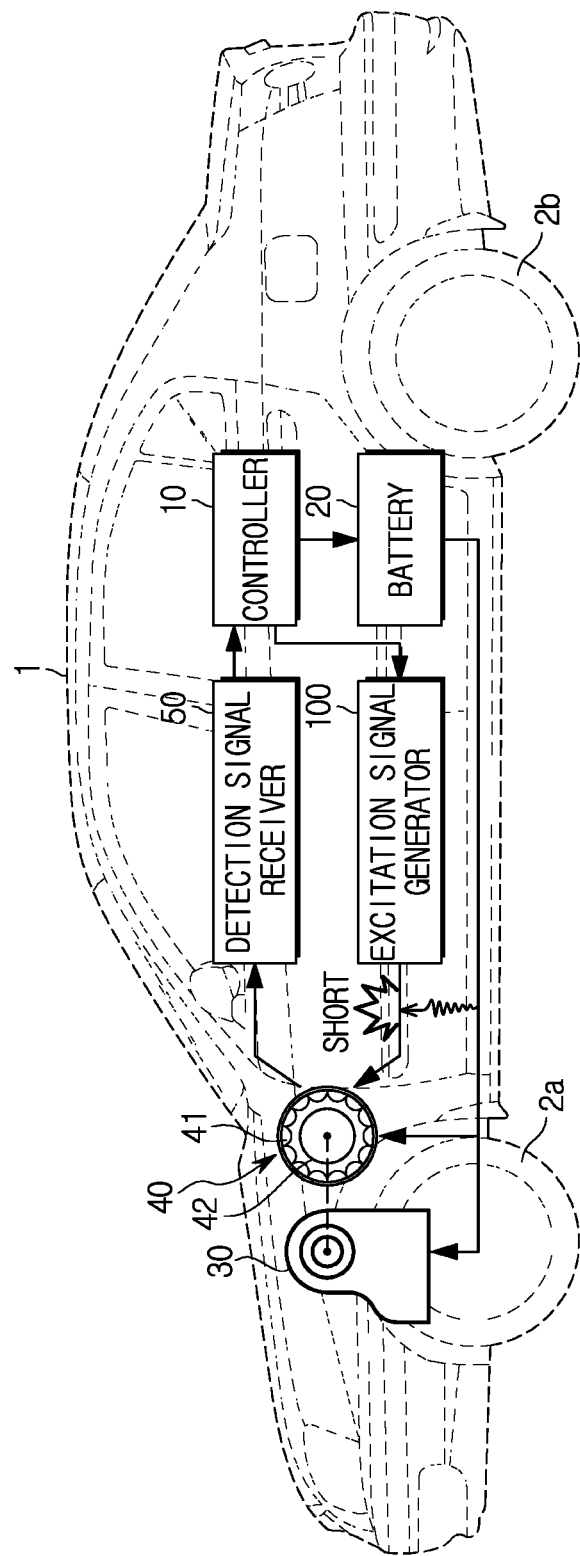
FIG. 1 is an exemplary block diagram illustrating a vehicle according to an exemplary embodiment of the present disclosure.

Reference will now be made in detail to the exemplary embodiments of the present disclosure, examples of which are illustrated in the accompanying drawings, wherein like reference numerals refer to like elements throughout. The present disclosure will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the present disclosure. The drawings and description are to be regarded as illustrative in nature and not restrictive and like reference numerals designate like elements throughout the specification. Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In addition, in the following detailed description, names of components, which are in the same relationship, are divided into "the first", "the second", and the like to distinguish the components, but the present disclosure is not limited to the order. Throughout the specification, unless explicitly described to the contrary, the word "comprise" and variations such as "comprises" or "comprising", will be understood to imply the inclusion of stated elements but not the exclusion of any other elements. In addition, "unit", "means", "part", "member", or the like, which is described in the specification, means a unit of a comprehensive configuration that performs at least one function or operation.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

An excitation signal generation circuit and a vehicle including the same according to exemplary embodiments of the present disclosure will hereinafter be described with reference to FIGS. 1 to 8. FIG. 1 is an exemplary block diagram illustrating a vehicle according to an exemplary embodiment of the present disclosure. Referring to FIG. 1, a vehicle 1 may travel on roads or tracks by rotation of one or more wheels 2a and 2b. Although the vehicle 1 may be an electric vehicle (EV), a hybrid electric vehicle (HEV), or a plug-in hybrid electric vehicle (PHEV), the scope or spirit of the vehicle 1 is not limited thereto, and the vehicle 1 may include various devices configured to acquire driving power required for vehicle traveling using a motor 30.

Referring to FIG. 1, the vehicle 1 may include a controller 10, a battery 20, a motor 30, a resolver 40, a detection signal receiver 50, and an excitation signal generator 100. In particular, at least two of the controller 10, the battery 20, the motor 30, the resolver 40, the detection signal receiver 50, and the excitation signal generator 100 may be configured to communicate with each other using conductive lines or various wireless communication devices. For example, the wireless communication devices may be implemented using wireless communication technology, for example, Wi-Fi, Bluetooth, Controller Area Network (CAN), or ZigBee. In accordance with an exemplary embodiment, the vehicle 1 may further include an engine (not shown) configured to acquire rotational force from at least one of a front wheel 2a and a rear wheel 2b using energy produced by combustion of fuels.

The controller 10 may be configured to execute overall operation of the vehicle 1. For example, the controller 10 may be configured to transmit a control signal to the excitation signal generator 100, may adjust excitation signal generator 100 to generate the excitation signal to transmit the generated excitation signal to the resolver 40. The controller 10 may electrically couple the battery 20 to the motor 30, or may be configured to determine an operation state of the motor 30 based on a signal received from the detection signal receiver 50. Therefore, the controller 10 may be configured to determine an operation of the motor 30 based on the operation state, and may be configured to operate the motor 30 to operate based on the determined operation. In addition, the controller 10 may be configured to transmit a control signal to at least one element (e.g., a navigation device) included in the vehicle 1, and may be configured to operate at least one element or device to perform a required operation. The controller 10 may include at least one processor having at least one semiconductor chip and associated elements thereof. For example, the processor 10 may include an electronic control unit (ECU), etc.

The battery 20 may be configured to store power required to operate the motor 30 and may be configured to provide the motor with the power based on a control signal of the controller 10. The battery 20 may be exchangeable as necessary. The battery 20 may be configured to receive power from an external power source or the motor 30 and may be charged with the received power. In addition, the battery 20 may be configured to provide power to the motor 30 and various electronic components (e.g., the controller 10 or the excitation signal generator 100) embedded in the vehicle 1.

In accordance with an exemplary embodiment, a plurality of batteries 20 may be disposed in the vehicle 1, and a subset of the batteries 20 may be designed to provide the motor 30 with power and another subset of the batteries 20 may be designed to provide power to other electronic components other than the motor 20, for example, the excitation signal generator 100, headlights, etc. The motor 30 may convert electric energy provided from the battery 20 into kinetic energy required to rotate at least one of the front wheel 2a and the rear wheel 2b. The motor 30 may include a stator and a rotor.

The resolver 40 may be configured to measure the degree of rotation of the rotor of the motor 30. For example, the resolver 40 may be configured to measure a rotation angle. The resolver 40 may include a stator 41 and a rotor 42. An excitation winding may be disposed in the stator 41. The rotor 42 of the resolver 40 may be configured to rotate in response to rotation of the rotor of the motor 30. When an excitation signal having a predetermined frequency is transferred from the excitation signal generator 100 to the excitation winding and the rotor 42 rotates in response to the operation of the motor 30, the resolver 40 may be configured to output different sinusoidal signals (i.e., a sine signal and a cosine signal) based on a change of magnetic flux interlinkage affected by back electromotive force.

The detection signal receiver 50 may be configured to receive a plurality of output signals from the resolver 40 and may be configured to transmit the plurality of output signals to the controller 10. The detection signal receiver 50 may be implemented using at least one circuit and may include an analog-to-digital converter (ADC) for converting the plurality of output signals into digital signals or an amplifier for amplifying the plurality of output signals, etc. Upon receiving the plurality of output signals from the detection signal receiver 50, the controller 10 may be configured to calculate a rotation angle of the rotor 42 of the resolver 40 based on the received output signals. The controller 10 may be configured to determine the degree of rotation of the rotor of the motor 30 based on the calculated rotation angle of the rotor 42 and may be configured to adjust the operation of the motor 30. For example, the controller 10 may be configured to adjust the motor 30 to rotate at a current angular speed. In addition, the controller 10 may be configured to generate a predetermined control signal, may be configured to adjust the motor 30 to rotate at an angular speed greater than the current angular speed using the predetermined control signal, or may be configured to adjust the motor to rotate at an angular speed less than the current angular speed as necessary.

Figure 2:
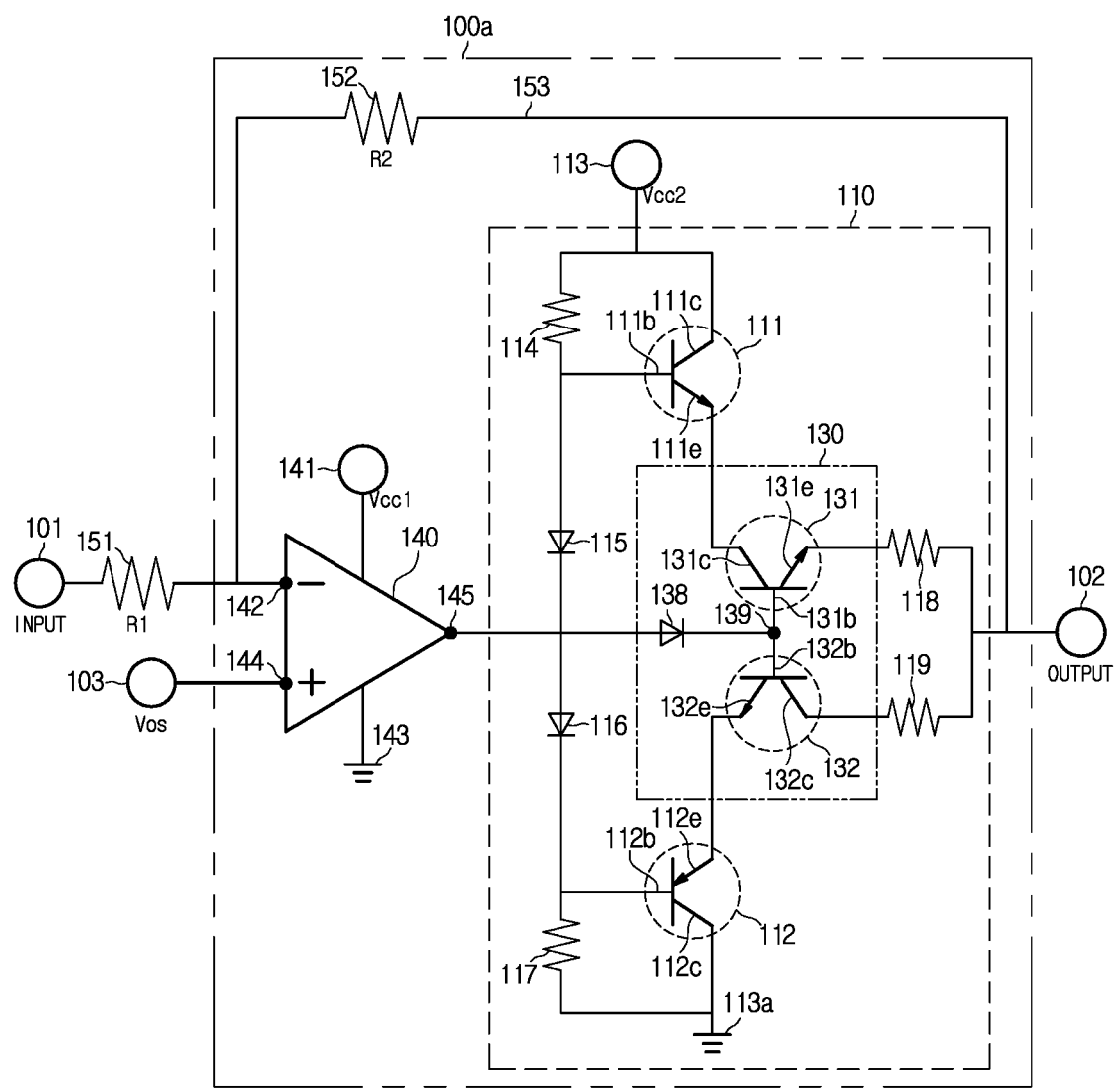
FIG. 2 is an exemplary circuit diagram illustrating an excitation signal generation circuit according to an exemplary embodiment of the present disclosure.

FIG. 2 is an exemplary circuit diagram illustrating an excitation signal generation circuit. Referring to FIG. 2, the excitation signal generator 100 may be configured to output the excitation signal to the excitation winding of the resolver 40. The excitation signal generator 100 may be implemented using a predetermined circuit 100a (hereinafter referred to as an excitation signal generation circuit). As shown in FIG. 2, the excitation signal generator 100 may include an input portion 101, an output portion 102, a current amplifier 110, and a voltage amplifier 140.

The input portion 101 may be directly or indirectly electrically coupled to the controller 10 to enable the input portion 101 to receive an electrical signal (i.e., an input signal) from the controller 10 and may be configured to transmit the received input signal to the circuit. An input signal generated from the input portion 101 may be transferred to the voltage amplifier 140 and may be transferred to the current amplifier. For example, the input signal may include an alternating current (AC) signal having a predetermined frequency. The input portion 101 may be electrically connected to an inversion input terminal 142 of the voltage amplifier 140 to input the electrical signal generated from the input portion 101 to the inversion input portion 142 of the voltage amplifier 140. In accordance with an exemplary embodiment, a first feedback resistor 151 may be disposed between the input portion 101 and the inversion input terminal 142.

The output portion 102 may be configured to output the electrical signal (i.e., an output signal used as an excitation signal) having a voltage amplified by the voltage amplifier 140 and/or a current amplified by the current amplifier 110 to an external component. The output portion 102 may be electrically connected to the excitation winding of the resolver 40. For example, the output portion 102 may be electrically connected to the excitation winding of the resolver 40, and may be electrically connected to the excitation winding using conductive lines embedded in the vehicle 1. The excitation signal generated from the output portion 102 may be applied to the excitation winding via conductive lines or the like and the resolver 40 may be configured to output a plurality of output signals that correspond to the operation of the rotor 42. The voltage amplifier 140 may be configured to amplify a voltage of the electrical signal generated from the input portion 101. For example, the voltage amplifier 140 may be implemented using an operational amplifier (OP-AMP). The voltage amplifier 140 may include an inversion input terminal 142 a non-inversion input terminal 144, and an output terminal 145.

The inversion input terminal 142 may be directly coupled to the input portion 101 or may be coupled to the input portion 101 via the first feedback resistor 151, and the input portion 101 may be configured to generate the electrical signal received by the inversion input terminal 142. In addition, the inversion input terminal 142 may be coupled to the output terminal of the current amplifier 110 and may be configured to receive a feedback signal generated from the current amplifier 110. In particular, the excitation signal generator 100 may include a feedback line 153 coupled between the input portion 101 and the inversion input terminal 142 or coupled between the output portion 102 and the output terminal of the current amplifier 110 and a second feedback resistor 152 disposed in the feedback line 153. The feedback signal that corresponds to the electrical signal generated from the current amplifier may be transferred to the inversion input terminal 142 after passing through the line 153 and the second feedback resistor 152.

The non-inversion input terminal 144 may be connected to a power-supply portion 103 configured to provide an input offset voltage (Vos). The output terminal 145 may be configured to output the electrical signal amplified by the voltage amplifier 140 to the current amplifier 110. In an exemplary embodiment, the output terminal 145 may be directly or indirectly electrically connected to a rectifier 138 included in a circuit protector 130 of the current amplifier 110. The voltage amplifier 140 may be connected to the power-supply portion 141 and a ground terminal 143 and the power-supply portion 141 may include at least one of a positive (+) power-supply voltage and a negative (−) power-supply voltage. The power-supply portion 141 may be configured to output a predetermined voltage (Vcc1) to the voltage amplifier 140 to amplify a voltage of the input signal by the voltage amplifier 140.

The current amplifier 110 may be configured to amplify a current of the electrical signal generated from the voltage amplifier 140. The current amplifier 110 may be implemented using a push-pull current amplifying circuit. Referring to FIG. 2, the current amplifier 110 may include the circuit protector 130. The circuit protector 130 may include a first transistor 131, a second transistor 132 and a first rectifier 138. In addition, the current amplifier 110 may include a third transistor 111 and a fourth transistor 112 electrically coupled to the circuit protector 130. In an exemplary embodiment, the current amplifier 110 may further include at least one resistor (e.g., first to fourth resistors 114, 117, 118, and 119) and/or at least one rectifier (e.g., a second rectifier 115 and a third rectifier 116). All or some of the above-mentioned resistors 114 to 119 may herein be omitted according to selection of the designer as necessary. Each of the first rectifier 138, the second rectifier 115, and the third rectifier 116 may be implemented using a diode.

In an exemplary embodiment, the current amplifier 110 may be configured in a manner that elements, nodes, and lines are respectively arranged symmetrical to each other. In other words, a first transistor 131 and a second transistor 132 may be arranged symmetrical to each other in the circuit 100a, a third transistor 111 and a fourth transistor 112 may be arranged symmetrical to each other in the circuit 100a, a first resistor 114 and a second resistor 117 may be arranged symmetrical to each other in the circuit 100a, a third resistor 118 and a fourth resistor 119 may be arranged symmetrical to each other in the circuit 100a, and a second rectifier 115 and a third rectifier 116 may be arranged symmetrical to each other in the circuit 100a.

In accordance an exemplary embodiment, the first transistor 131 and the third transistor 111 may be directly or indirectly electrically connected to each other. Each of the first transistor 131 and the third transistor 111 may be a Negative-Positive-Negative (NPN) transistor. In particular, a collector 131c of the first transistor 131 may be connected to an emitter 111e of the third transistor 111. A base 131b of the first transistor 131 may be connected to a base 132b of the second transistor 132. Additionally, an emitter 131e of the first transistor 131 may be connected to the output portion 102. The third resistor 118 may be disposed between the emitter 131e of the first transistor 131 and the output portion 102.

A collector 111c of the third transistor 111 may be electrically connected to the external power source 113. Accordingly, a current corresponding to a predetermined voltage (Vcc2) supplied from the external power source 113 may be applied to the collector 111c of the third transistor 111. An emitter 111a of the third transistor 111 may be configured to output a current corresponding to the supplied current to a collector 131c of the third transistor 131. The base 111c of the third transistor 111 may be electrically coupled to the first resistor 114 and the second rectifier 115.

In accordance with an exemplary embodiment, the second transistor 132 and the fourth transistor 112 may be directly or indirectly electrically connected to each other. In accordance with another exemplary embodiment, the second transistor 132 may be a NPN transistor, and the fourth transistor 112 may be a (Positive-Negative-Positive) PNP transistor. In other words, an emitter 132e of the second transistor 132 may be directly or indirectly electrically connected to the collector 112c of the fourth transistor 112. In the same manner as described above, the base 132b of the second transistor 132 may be directly or indirectly electrically connected to the base 131b of the first transistor 131 and the collector 132c of the second transistor 132 may be connected to the output portion 102. The collector 112c of the fourth transistor 112 may be connected to the emitter 132e of the second transistor 132, and each of the emitter 112e and the base 112b of the fourth transistor 112 may be connected to a ground terminal 113a or the second resistor 117.

The first rectifier 138 may be configured to acquire a voltage that initiates operation of the first transistor 131 and the second transistor 132 in a normal state (e.g., without short-circuiting). A first end of the first rectifier 138 may be connected to the output terminal 145 of the voltage amplifier 140. A second end (e.g., the other end) of the first rectifier 138 may be electrically connected to a node 139 formed in a line through which the base 131b of the first transistor 131 may be connected to the base 132b of the second transistor 132. In other words, the first rectifier 138, the base 131b of the first transistor 131, and the base 132b of the second transistor 132 may be connected to one node 139. Therefore, the electrical signal, which is amplified by the voltage amplifier 140 and output from the output terminal 145, may be applied to at least one of the base 131b of the first transistor 131 and the base 132b of the second transistor 132 after passing through the first rectifier 138.

Figure 3:
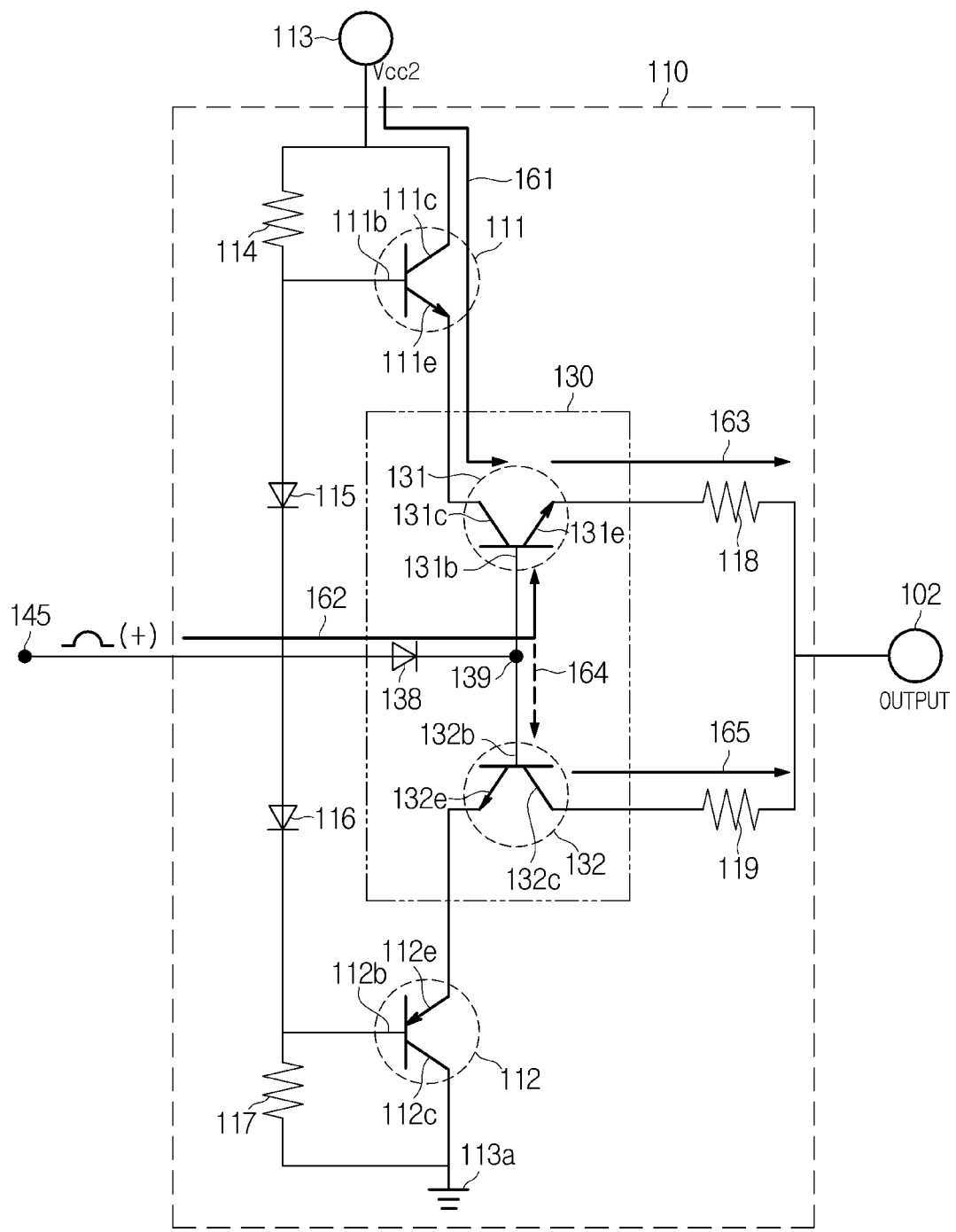
FIG. 3 is an exemplary circuit diagram illustrating an example of the flow of a current in a normal state according to an exemplary embodiment of the present disclosure.
Figure 4:
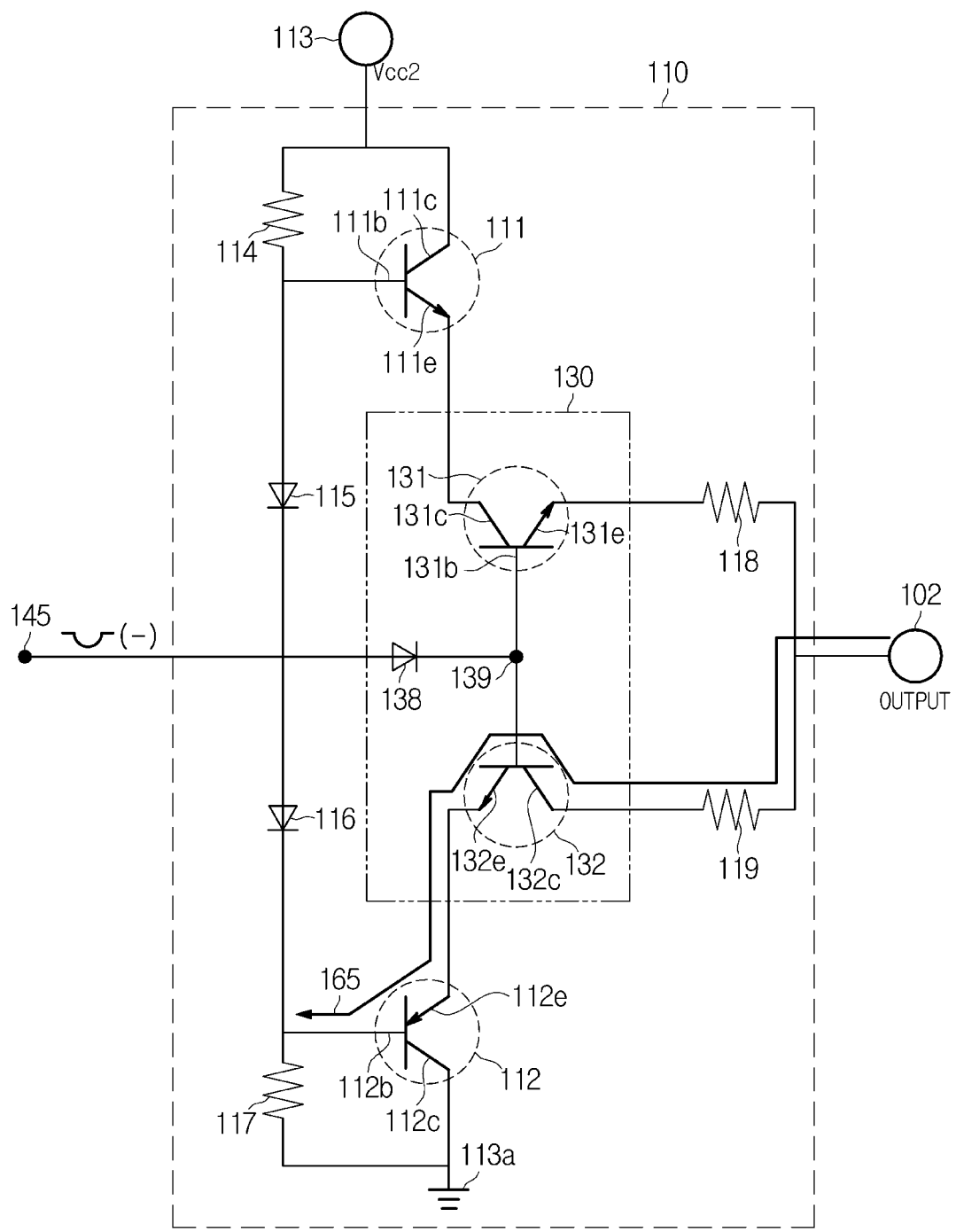
FIG. 4 is an exemplary circuit diagram illustrating another example of the flow of a current in a normal state according to an exemplary embodiment of the present disclosure.

The operations of the excitation signal generator 100 will hereinafter be described. FIG. 3 is an exemplary circuit diagram illustrating an example of the flow of a current in a normal operation state. FIG. 4 is an exemplary circuit diagram illustrating an alternative example of the flow of a current in a normal operation state. During the normal operation state without short-circuiting, a direct current (DC) offset voltage of the input signal may be similar to a DC offset voltage of the output signal. Further, the excitation signal generation circuit 100a may have a symmetrical structure as shown in FIG. 2. Accordingly, an offset of a voltage of the base 131b of the first transistor 131 and an offset of a base voltage of the base 132b of the second transistor 132 may be respectively similar to a DC offset voltage of the input signal and a DC offset voltage of the output signal.

When the output terminal 145 of the voltage amplifier 140 outputs a positive signal (i.e., a positive (+) half-wave signal) as shown in FIG. 3, the emitter 111c of the third transistor 111 may be coupled to the collector 131c of the first transistor 131 and the base 131b of the first transistor 131 may be coupled to the output terminal 145 after passing through the first rectifier 138, to initiate (e.g., turn on)

operation of the first transistor 131 and the third transistor 111. Accordingly, a current 161 of the predetermined voltage (Vcc2) supplied from the external power source 113 may be applied to the collector 131c of the first transistor 131 after passing through the third transistor 111. In addition, an electrical signal 162 generated from the output terminal 145 may be applied to the base 131b of the first transistor 131 after passing through the first rectifier 138 and the node 139. Therefore, the emitter 131e of the first transistor 131 may be configured to output a signal 163 acquired by amplification of the electrical signal 162. In accordance with an exemplary embodiment, the amplified signal 163 may be applied to the output portion 102 after passing through the third resistor 118.

Further, when the fourth transistor 112 is disengaged (e.g., is turned off and does not operate), the base 131b of the first transistor 131 may be coupled to the base 132b of the second transistor 132, to initiate (e.g., turn on) operation of the second transistor 132. In particular, when current does not flow in the fourth transistor 112 and a voltage of the base 132 is maintained in the second transistor 132, implementation of a saturation state occurs. Additionally, a voltage of the emitter 132e of the second transistor 132 may be similar to a voltage of the fourth transistor 112 and a current may be configured to flow in the second transistor 132. Therefore, portions 164 of the electrical signal 16 applied to the node 139 through the first rectifier 138 may be input to the base 132b of the second transistor 132. When the current 164 is input to the base 132b of the second transistor 132, the collector 132c of the second transistor 132 may be configured to generate the current 165. The generated current 165 may be applied to the output portion 102 after passing through the fourth resistor 119. Therefore, the current 163 generated from the first transistor and the current 165 generated from the second transistor 132 may be applied to the output portion 102. The output portion 102 may be configured to output an electrical signal (i.e., an excitation signal) that corresponds to the currents 163 and 165.

Referring to FIG. 4, the output terminal 145 of the voltage amplifier 140 may be configured to output a negative signal (i.e., a negative (−) half-wave signal) as shown in FIG. 4. When each of a voltage of the base 131b of the first transistor 131 and a voltage of the base 132b of the second transistor 132 reaches an offset voltage of the excitation signal, the first rectifier 139 may be disengaged (e.g., turned off) and the voltage of the base 131b of the first transistor 131 may be maintained at an offset voltage until operation of the fourth transistor 112 is initiated (e.g., turned on and operates). Accordingly, the second transistor 132 may be turned on and a current may flow therein. When the fourth transistor 112 is turned on upon receiving a negative (−) signal, the current 165 may flow as shown in FIG. 4 and the excitation signal may be generated in the current amplifier 110.

According to an input of the positive (+) signal and the negative (−) signal, the alternating current (AC) voltage of the excitation signal generated by the excitation signal generator 100 may range from about −7.35 V to 7.35 V as an example and the alternating current of the excitation signal may range from about −60 mA to 60 mA as an example. However, the scope or spirit of the voltage and current of the excitation signal is not limited thereto, and different voltages and currents of the excitation signal may be used either according to selection of the designer or according to voltages received from the power-supply portions 113 and 141.

Figure 5:
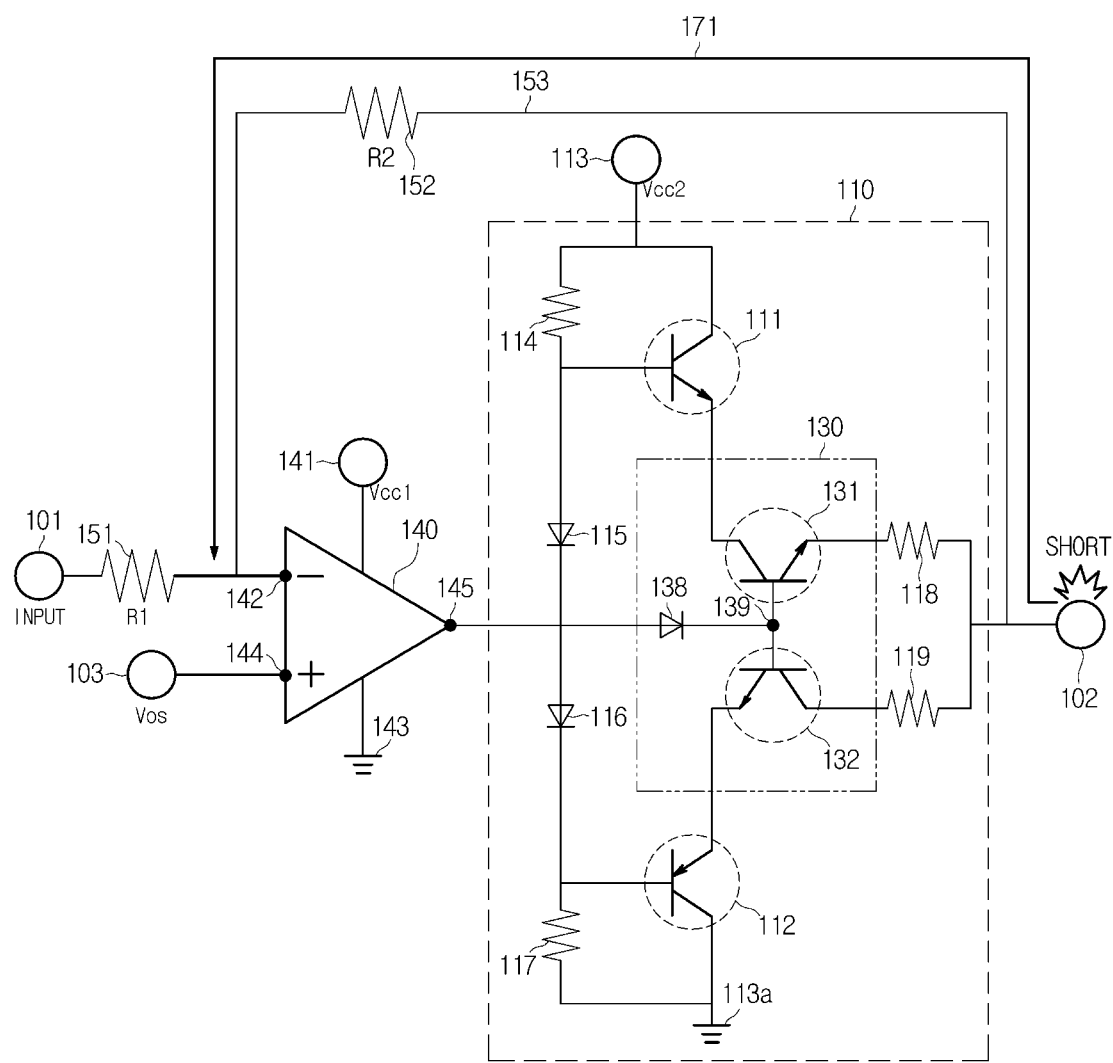
FIG. 5 is an exemplary circuit diagram illustrating flow of a current in a case in which the output portion is short-circuited and a high voltage is applied to the output portion according to an exemplary embodiment of the present disclosure.

FIG. 5 is an exemplary circuit diagram illustrating flow of a current when the output portion is short-circuited and a high voltage is applied to the output portion. For example, a first conductive line that couples the output portion 102 of the excitation signal generator 100 to the stator 41 of the resolver 40 and a second (e.g., the other) conductive line that couples the battery 20 to the motor 30 and/or the resolver may be arranged adjacent to each other. In particular, short-circuiting may occur between both conductive lines as shown in FIG. 1. When the conductive line that couples the excitation signal generator 100 to the resolver 40 is short-circuited to another conductive line, a relatively high voltage may be formed in the output portion 102 of the excitation signal generator 100.

When a relatively high voltage is applied to the output portion 102, the current 171 may be transferred from the output portion 102 to the inversion input terminal 142 of the voltage amplifier 140 via the feedback line 153. In particular, the output signal of the voltage amplifier 140 may be transferred to the ground terminal 143 and the output terminal 145 may not output the electrical signal. Therefore, the first rectifier 138 may be disengaged (e.g., turned off) and each of the voltage of the base 131b of the first transistor 131 and the voltage of the base 132b of the second transistor 132 may converge on zero volts (0V) or an approximate value. When each of the voltage of the base 131b of the first transistor 131 and the voltage of the base 132b of the second transistor 132 converge on 0V or an approximate value, the first transistor 131 and the second transistor 132 may also be disengaged (e.g., turned off).

When the first transistor 131 and the second transistor 132 are turned off, flow of a current between the current amplifier 110 and the output portion 102 is interrupted, and the electrical connection between the output portion 102 and the respective elements of the current amplifier 110 may be severed. Therefore, although the output portion 102 is short-circuited, a high-voltage current may not flow in the current amplifier 110 and the respective elements (e.g., the first transistor 131, the second transistor 132, etc.) of the current amplifier 110 may be protected. Additionally, when the second feedback resistor 152 has a high resistance R2 (e.g., about 100Ω), a current may have a reduced flow in a closed loop formed by the output portion 102 and the voltage amplifier 140 to prevent damage to the circuit 100a at a relatively high voltage and the respective elements included in the circuit 100a may be protected.

Figure 6:
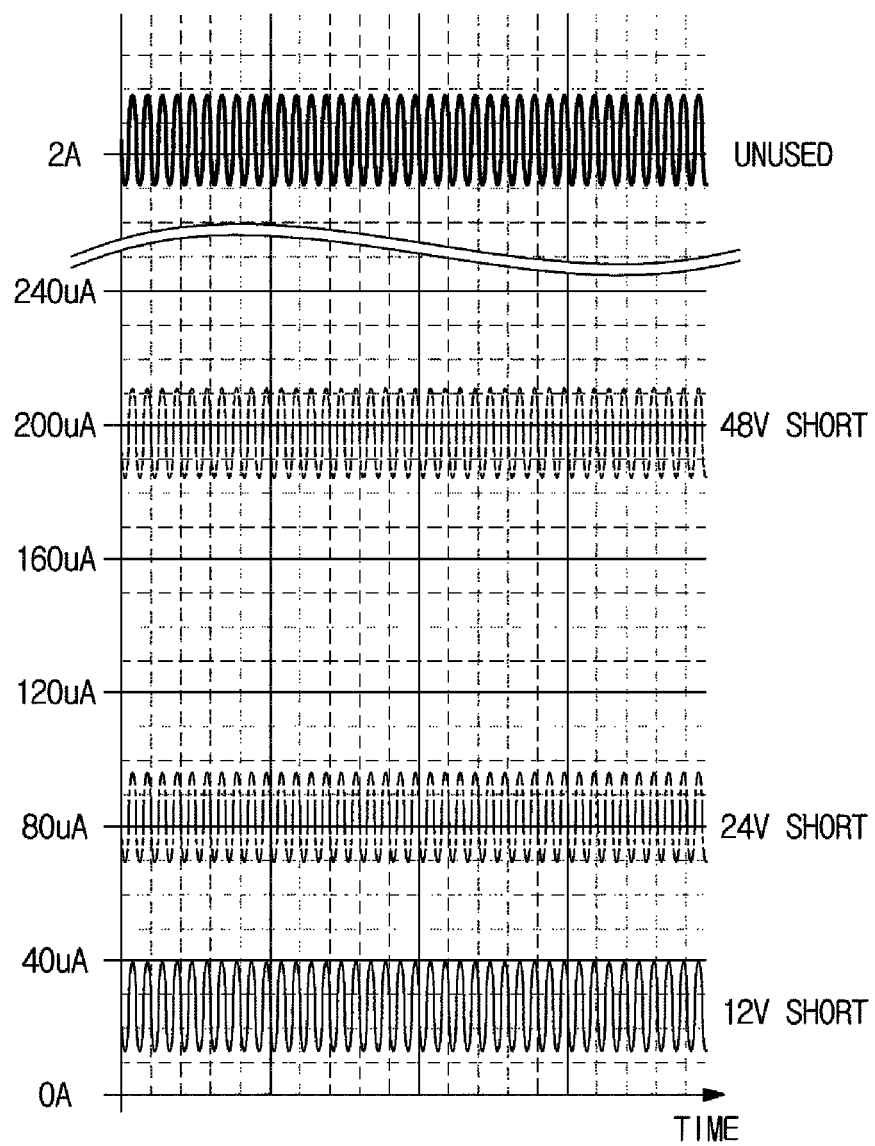
FIG. 6 is an exemplary graph illustrating intensity of a current generated from the output portion when the output portion is short-circuited and a high voltage is applied to the output portion according to an exemplary embodiment of the present disclosure.

FIG. 6 is an exemplary graph illustrating intensity of a current generated from the output portion under the condition that the output portion is short-circuited and a high voltage is applied to the output portion. FIG. 6 illustrates the current 171 flowing along the feedback line 153 when the output portion 102 is short-circuited. In FIG. 6, waveforms shown in the uppermost part (hereinafter referred to as the first part) of FIG. 6 may illustrate a flowing current generated when the above-mentioned circuit protector 130 is not used. Additionally, waveforms shown in the second portion of FIG. 6 may illustrate a flowing current generated when a voltage of about 48V is applied to the output portion 102 and waveforms shown in the third portion of FIG. 6 may illustrate a flowing current generated when a voltage of about 24V is applied to the output portion 102. Finally, waveforms shown in the lowermost part of FIG. 6 may illustrate a flowing current generated when a voltage of about 12v is applied to the output portion 102.

When the circuit protector 130 is not used as described above, a current of about 2 A may flow in the feedback line 153. Therefore, an overcurrent may flow in the circuit 100a, and elements such as transistors (131, 132, etc.) relatively vulnerable to the overcurrent may be damaged resulting a damaged circuit. When the current amplifier 10 is implemented using the above-mentioned circuit protector 130, the voltage of about 12V is applied to the output portion 102 due to short-circuiting and a current of about 30 µA may flow through the feedback line 153. When the voltage of about 24V is applied to the output portion 102 due to short-circuiting, a current of about 90 µA may flow through the feedback line 153. Additionally, when the voltage of 48V is applied to the output portion 102 due to short-circuiting, a current of about 200 µA may flow through the feedback line 153. In other words, when the current amplifier 110 is implemented using the above-mentioned circuit protector 130 a reduced (e.g., a relatively very low) current may be configured to flow in the circuit 100a to prevent the circuit 100a from being damaged by overcurrent. The voltages and currents shown in FIG. 6 are merely exemplary, the scope or spirit of the present disclosure is not limited thereto, and different voltages and/or different currents may be used in the actual implementation of the present disclosure as necessary.

Figure 7:
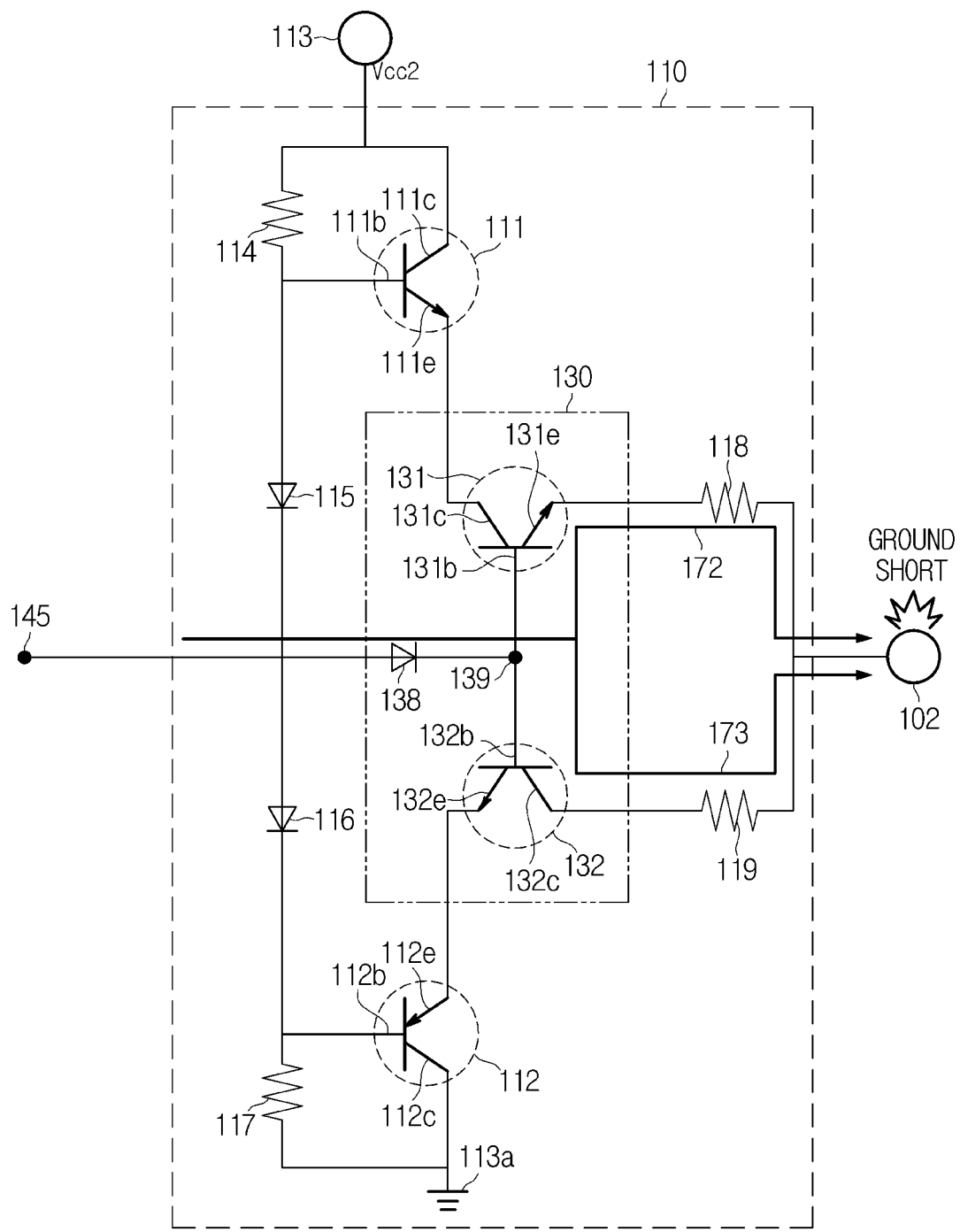
FIG. 7 is an exemplary circuit diagram illustrating flow of a current when ground short-circuiting occurs according to an exemplary embodiment of the present disclosure.

FIG. 7 is an exemplary circuit diagram illustrating flow of a current when ground short-circuiting occurs. For example, a conductive line coupled to the output portion 102 of the excitation signal generator 100 may be coupled to a ground terminal resulting in ground short-circuiting. When the output portion 102 is short-circuited to the ground terminal, a feedback signal of the output portion 102 may be input to the inversion input terminal 142 of the voltage amplifier 140 and the output terminal 145 of the voltage amplifier 140 may be configured to output an electrical signal that corresponds to the voltage of the output portion 102. The electrical signal generated from the output terminal 145 may be transferred to the first rectifier 138.

The first transistor 131 and the third transistor 111 may be NPN transistors and the emitter 111e of the third transistor 111 and the emitter 131e of the first transistor 131 may be coupled to the ground terminal to engage (e.g., turn on) the first and third transistors 131 and 111. Conversely, the emitter 112e of the fourth transistor 112 acting as a PNP transistor may be coupled to the ground terminal to disengage (e.g., turn off) the fourth transistor 112. When the voltage of the base 132b of the second transistor 132 is maintained in the first transistor 131 and the fourth transistor 112 are turned off, the second transistor 132 may be configured to enter a saturation state and a current may flow in the second transistor 132. As shown in FIG. 7, the electrical signal applied to the first rectifier 138 may be divided into two directions, (i.e., the direction of the first transistor 131 and the direction of the second transistor 132) at the node 139 and may then be applied to the output portion 102. In other words, a portion of the current 172 may flow along the first transistor 131, and another portion of the currents 173 may flow along the second transistor 131. Therefore, the current 172 applied to each element (e.g., the first transistor 131) of the current amplifier 110 may be limited in magnitude. In other words, an overcurrent may be prevented from flowing in the respective elements of the current amplifier 110.

Figure 8:
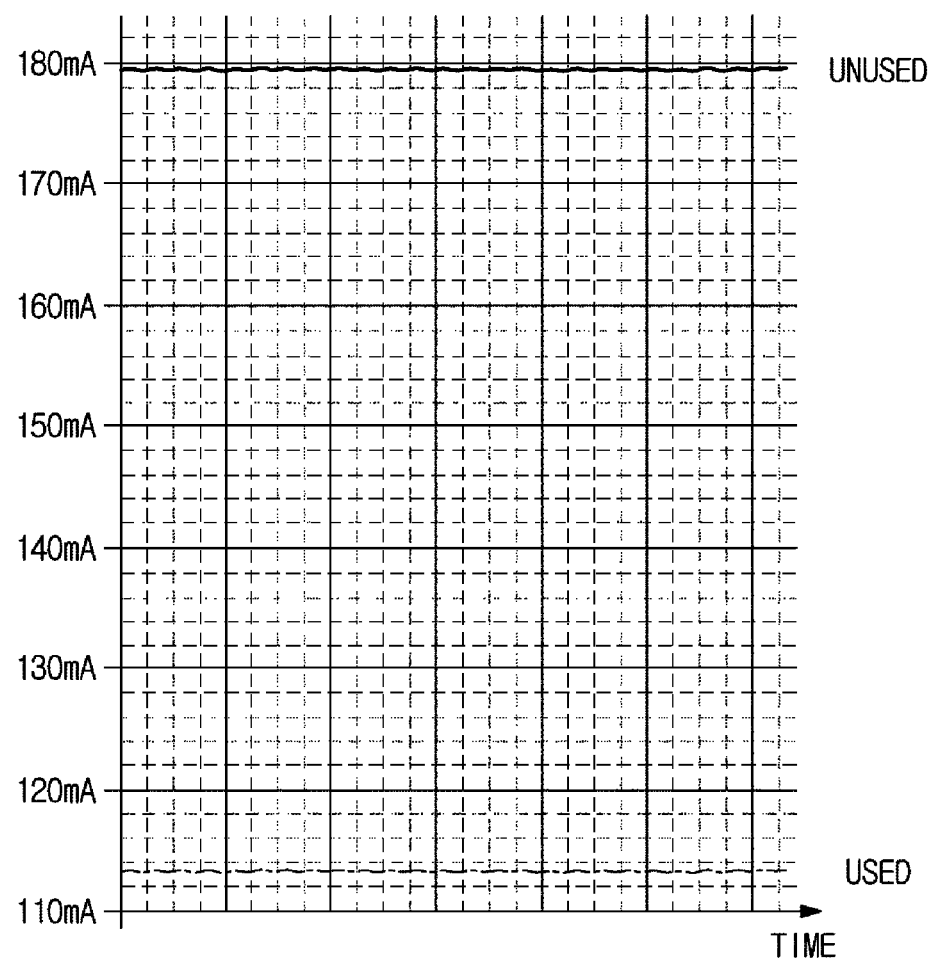
FIG. 8 is an exemplary graph illustrating intensity of a current generated from the output portion when ground short-circuiting occurs according to an exemplary embodiment of the present disclosure.

FIG. 8 is an exemplary graph illustrating intensity of a current generated from the output portion under the condition that ground short-circuiting occurs. The graph shown in the upper portion of FIG. 8 illustrates a current flowing in the circuit when the above-mentioned circuit protector 130 is not used. Additionally, the graph shown in the lower portion of FIG. 8 illustrates a current flowing in the circuit when the circuit protector 130 is used. When the circuit protector 130 is not used and the output portion 102 is short-circuited to the ground terminal, a current of about 170 mA may flow in the circuit. However, when the circuit protector 130 is used, a current restructured to about 100 mA may flow in the circuit 100a. In other words, when the output portion 102 is coupled to the ground terminal due to short-circuiting, an overcurrent may be prevented from flowing in the circuit 100a to prevent constituent elements (e.g., the first transistor 131 and the second transistor 132) from being damaged by overcurrent.

The apparatus for generating the resolver excitation signal and the vehicle including the same according to the exemplary embodiments of the present disclosure may improve safety of a circuit configured to generate an excitation signal. The apparatus for generating the resolver excitation signal and the vehicle including the same according to the exemplary embodiments of the present disclosure may prevent an excitation signal generation circuit from being damaged by an overcurrent caused by short-circuiting and the excitation signal generation circuit vulnerability to short-circuiting may be improved and safety of the excitation signal generation circuit may be increased.

The apparatus for generating the resolver excitation signal and the vehicle including the same according to the exemplary embodiments may prevent the excitation signal generation circuit from being damaged by an overcurrent and may prevent various circuits coupled to or that include the excitation signal generation circuit from being damaged and safety of the vehicle including the circuits may be improved. The apparatus for generating the resolver excitation signal and the vehicle including the same may be configured to generate an excitation signal without damaging elements included in each circuit even when a high voltage is applied to the circuit and may be configured to transfer the generated excitation signal to a resolver. Further, safety of the excitation signal generation circuit without increasing the number of elements included in each circuit may be achieved thereby resulting in an economical cost advantage. The apparatus for generating the resolver excitation signal and the vehicle including the same have been described. However, the apparatus for generating the resolver excitation signal and the vehicle including the same is not only limited to the above exemplary embodiment.

An exemplary embodiments modified based on the above-described exemplary embodiments may be an example(s) of the apparatus for generating the resolver excitation signal and the vehicle including the same described above. For example, even if at least one of the described components of the system, structure, device, circuit, etc., may be combined in a different form, or replaced by other components or equivalents, it is possible to obtain the same or similar result as the apparatus for generating the resolver excitation signal and the vehicle including the same.

Although exemplary embodiments of the present disclosure have been shown and described, it would be appreciated by those skilled in the art that changes may be made in these exemplary embodiments without departing from the principles and spirit of the disclosure, the scope of which is defined in the claims and their equivalent.

The invention claimed is:

1. An apparatus for generating an excitation signal, comprising:
   an input portion configured to receive an input signal;
   a current amplifier configured to generate an output signal by amplifying the input signal, and having a circuit protector that protects a circuit from an overcurrent;
   a voltage amplifier having an inversion input terminal connected to the input portion and an output terminal connected to the rectifier, configured to amplify the input signal and transmit the amplified input signal to the rectifier; and an output portion configured to transmit the output signal, wherein the circuit protector includes:
- a first transistor having an emitter connected to the output portion;
- a second transistor having a collector connected to the output portion and a base connected to a base of the first transistor; and
- the rectifier connected to the base of the first transistor and the base of the second transistor, and
- wherein when the output portion is electrically short-circuited, the rectifier terminates operation, and the inversion input terminal of the voltage amplifier receives the output signal via a path that applies the feedback signal to the inversion input terminal.

2. The apparatus according to claim 1, wherein the base of the first transistor, the base of the second transistor, and the rectifier are connected to one node.

3. The apparatus according to claim 1, wherein the inversion input terminal is configured to receive the feedback signal that corresponds to the output signal.

4. The apparatus according to claim 1, wherein the current amplifier further includes:
- a third transistor having a collector connected to an external power source and an emitter connected to a collector of the first transistor.

5. The apparatus according to claim 4, wherein when the output portion is not electrically shorted and the voltage amplifier outputs a positive signal, the base of the first transistor is configured to receive all or a portion of the input signal and the emitter of the first transistor is configured to amplify a current of the input signal and outputs the amplified current.

6. The apparatus according to claim 5, wherein the base of the second transistor receives the portion of the input signal, and the collector of the second transistor is configured to amplify the portion of the input signal and output the amplified signal.

7. The apparatus according to claim 1, wherein the current amplifier includes a fourth transistor having an emitter connected to an emitter of the second transistor.

8. The apparatus according to claim 7, wherein when the voltage amplifier outputs a positive signal, the fourth transistor terminates operation; and when the voltage amplifier outputs a negative signal, the fourth transistor initiates operation.

9. The apparatus according to claim 1, wherein when the output portion is electrically short-circuited to a ground terminal, the output portion receives the input signal through the rectifier and the first transistor, or through the rectifier and the second transistor.

10. A vehicle, comprising:
- a resolver electrically connected to a motor and configured to detect the degree of rotation of the motor; and
- an excitation signal generator configured to provide the resolver with an excitation signal,
- wherein the excitation signal generator includes,
  - an input portion configured to receive an input signal;
  - a current amplifier configured to generate an output signal by amplifying the input signal, and having a circuit protector that protects a circuit from an overcurrent;
    - a voltage amplifier having an inversion input terminal connected to the input portion and an Output terminal connected to the rectifier, configured to amplify the input signal and transmit the amplified input signal to the rectifier;
  - an output portion configured to output the excitation signal;
  - a first transistor having an emitter connected to the output portion;
  - a second transistor having a base connected to a base of the first transistor and a collector connected to the output portion; and
  - the rectifier electrically connected to the input portion, and connected to the base of the first transistor and the base of the second transistor,
  - wherein when the output portion is electrically short-circuited, the rectifier terminates operation, and the inversion input terminal of the voltage amplifier receives the output signal via a path that applies the feedback signal that corresponds to the output signal to the inversion input terminal.

* * * * *